April 1, 1958  D. R. KENNEMER  2,828,785
WOOD TRIMMING DEVICE WITH ADVANCE GROOVING CUTTER
Filed Dec. 2, 1954

INVENTOR
DAVID ROY KENNEMER
BY *Lamont Johnston*
ATTORNEY

United States Patent Office 2,828,785
Patented Apr. 1, 1958

2,828,785

WOOD TRIMMING DEVICE WITH ADVANCE GROOVING CUTTER

David R. Kennemer, Stevenson, Ala., assignor to Chickamauga Cedar Co., Inc., Stevenson, Ala., a corporation of Alabama Application December 2, 1954, Serial No. 472,606

3 Claims. (Cl. 144—3)

This invention relates to a process and apparatus for trimming wood, and more particularly for grooving the surface of a piece of wood to prevent splintering of sawed portions of the wood.

It is a common experience in sawing wood, whether it be performed manually or mechanically, for the saw blade to cause splintering of the wood surface adjacent the departing saw blade. The splintering is caused as the saw has nearly completed its cut by the pressure of the saw blade against the few remaining unsupported connecting fibers of the wood. Instead of cutting the fibers, the saw blade causes them to break at various points along the surface. The fibers on the bottom surface of a piece of wood being sawed from the top do not share the vertical support afforded by adjacent fibers as in other positions of the wood. Consequently, this splintering is detrimental to the appearance of the wood and particularly to finished wood products, such as flooring, sidings, partitions and ceilings.

It is therefore an object of this invention to overcome the disadvantages enumerated and to provide a process and apparatus for eliminating surface splintering resulting from saw cuts in wood trimming machines.

Another object of this invention is to provide a process and apparatus for forming wood products having smooth end surfaces.

Another object of this invention is to provide a process and apparatus for trimming the ends of finished wood products by pre-grooving the surface areas to be cut.

Further objects and advantages of the invention will be apparent from the following description, taken in conjunction with the drawings, wherein.

Briefly stated, the invention comprises a process and apparatus for trimming wood and particularly the sawed ends of boards such as flooring, sidings, partitions and ceilings. The process consists in pre-grooving the wood on the side of saw blade departure and in a plane substantially coinciding with the plane of the saw cut. The preferred device for carrying out this process is a rotary disc blade mounted in advance of a trim saw in a sawing machine. The saw and rotary blade are in substantial alignment with each other. The wood to be trimmed is fed across the disc blade, where it is grooved, and then into the trim saw, which cuts along the groove from the opposite side, producing a finished product having a smooth, unsplintered end with a slightly beveled edge.

Figure 1:
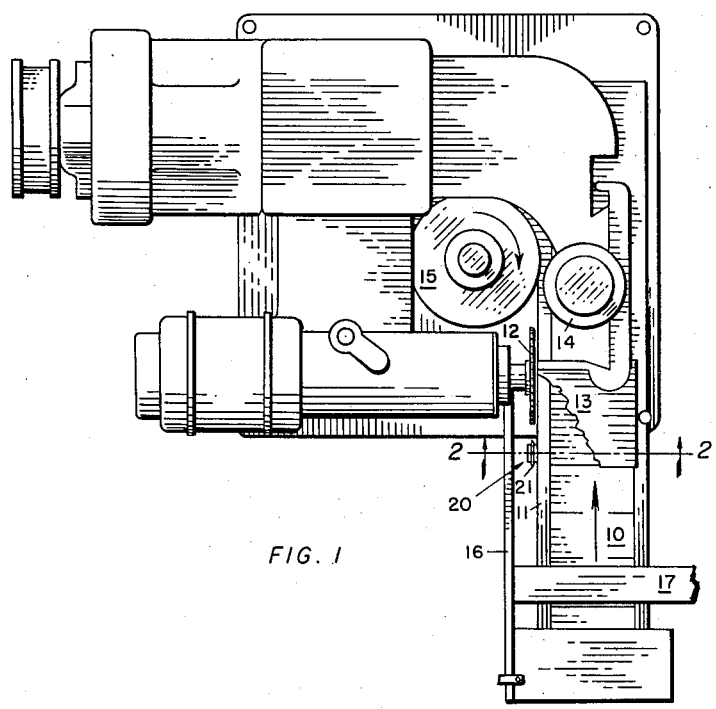
Fig. 1 is a plan view of one embodiment of the invention associated with a grooving unit of an end-matcher.

Referring now to the drawings in more detail, Fig. 1 is a plan view of a grooving unit of an end-matcher. The purpose of the machine is to trim and square the ends of finished boards, such as flooring, and to saw a horizontal groove in one end of a board. Another unit of the end matcher, called a tongue unit, forms a horizontal tongue on the other end of the board which has been grooved, so that each board may be mated with any other board, by fitting the tongue of one board into the groove of another. The principal working parts of a grooving unit are a feed belt 10, a feed belt frame 11, a trim saw 12, a pressure bar frame 13, a pressure bar vertical adjusting hand wheel 14, a groove saw 15 and a guide 16. A board, such as flooring 17, is carried transversely by the feed belt 10, with one end of the flooring 17 abutting against the guide 16. The flooring is fed to the trim saw 12, which automatically trims and squares one end of the flooring. The flooring 17 continues to travel past the trim saw until its trimmed end engages the groove saw 15 which cuts a horizontal groove approximately midway between the top and bottom surfaces in the end of the flooring 17. The cuts of the trim and groove saws are illustrated by dotted lines in Fig. 2, which also illustrates how the flooring 17 is held between pressure bar shoes 18, attached to and actuated by the pressure bar frame 13, and the feed belt frame 11, urged upward by pressure shoe springs 19.

Figure 3:
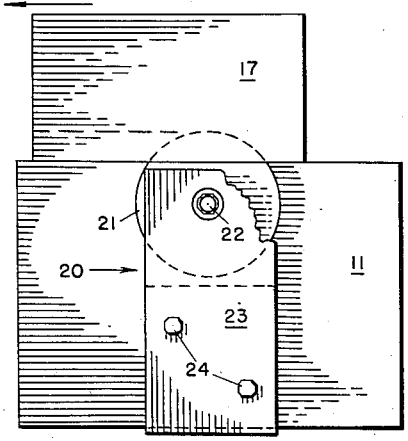
Fig. 3 is a greatly enlarged side elevation, viewed from the left in Fig. 1, showing the trimming unit operating on a piece of finished wood.

The invention in its preferred embodiment is represented generally by the reference numeral 20 and comprises a rotary disc blade 21 having a beveled edge and mounted to freely rotate on an axle 22 within a block 23. The device 20 is mounted by any suitable means, such as bolts 24, to the side of the feed belt frame 11 as shown in Figs. 1, 2 and 3, so that the top of the blade extends slightly above the upper surface of the feed belt, as noted in Figs. 2 and 3, and is in direct alignment with or slightly offset to the side of the trim saw away from the guide 16, so that the blades will cut in coincident or closely spaced parallel planes.

Figure 2:
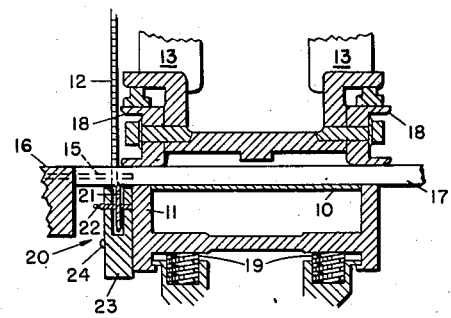
Fig. 2 is an enlarged section along the line 2—2 in Fig. 1 showing the same embodiment of the invention operating on a piece of finished wood.

Figs. 1 and 2 illustrate the rotary disc blade 21 offset from the trim saw 12 so that the bottom edge of the cut will have a more pronounced bevel than if the blades 21 and 12 were in direct alignment. The device 20 is also placed in advance of the trim saw, as shown in Fig. 1, so that it may operate on the bottom surface of the flooring 17 before the trim saw makes its downward cut.

As the flooring 17 is conveyed by the belt 10 toward the device 20, the flooring is gripped between the pressure bar shoes 18 and the belt frame 11 and is snugly engaged by virtue of the pressure springs 19, compressed to urge the feed belt frame upward against the bottom of the flooring 17. The pressure bar shoes 18 are adjustable through the hand wheel 14, so that flooring of various thicknesses may be accommodated. As the flooring 17 passes over the device 20, a shallow transverse groove is formed in the bottom surface of the flooring, by virtue of the sharpness of the rotary blade 21 and the downward pressure exerted by the pressure bar shoes 18. Accordingly, no drive means is needed for the axle 22. After passing over the rotary blade 21, the flooring 17 is engaged by the trim saw 12 which cuts down into and across the flooring 17 along a plane which either coincides with the groove or is parallel to and slightly offset from the groove, so that the trim saw completes its cut within the groove before reaching the bottom surface of the flooring 17. The resulting product is a finished piece of flooring having a smooth, square end, a very slightly beveled bottom edge which is barely noticeable, and certainly less noticeable and more attractive than a splintered bottom surface adjacent the cut. The flooring 17 may then be conveyed to the grooving saw 15, where the end is grooved so that it may mate with the tongue end of another piece of flooring, or it may be further treated in any way desirable.

It is to be understood that the trimming device 20 may be used with any type of sawing machine and does not necessarily have to be used on a grooving unit of an end-matcher for flooring, which is here described by way of illustration only. The device 20 is also not restricted to use with a disc saw, but may also be used with any other type of saw, such as a band saw or a reciprocating saw. In the event it is used with a reciprocating saw, a pair of devices 20 would be necessary to pre-groove both sides of the wood to be trimmed, because a reciprocating saw alternately departs from the surfaces on either side. The wood may be pre-grooved from either side, so long as it is on the side opposite from the entry of the saw blade.

It is also not necessary for the purpose of this invention for the trimming device to comprise a rotary disc blade, but it may be a stationary knife blade or any other type of means which will cut a continuous shallow groove in the surface of the wood in the path of the saw blade. If the trimming device is used in a sawing machine in which the downward pressure on the wood is insufficient to allow the device to cut a groove in the wood, then it would be advisable to associate driving means with the cutting blade.

The importance of the invention resides in its relative location to the trim saw and the wood to be trimmed. The trimming device must cut the surface of the wood before the trim saw makes its cut; it must cut a groove in the surface of the wood on the opposite side from which the saw enters; and it must cut a groove substantially in line with the action of the saw, so the saw will cut completely through the wood and into the groove.

It will be apparent to those skilled in the art, that various changes may be made in the invention, without departing from the spirit and scope thereof, and therefore the invention is not limited by that which is shown in the drawings and described in the specification, but only as indicated in the appended claims.

What is claimed is:

1. In an end-matcher for trimming wooden boards comprising a vertical cross-cut saw and a continuous horizontal belt for feeding boards to the saw, the saw being mounted for entering the upper surfaces of the boards adjacent the feed belt and extending below the upper surface of the feed belt, a rotary disc blade mounted adjacent said feed belt in advance of and substantially coplanar with the vertical cross-cut saw, the top of the disc blade extending slightly above the plane of the feed belt, and means for exerting continuous pressure between said disc blade and a board passing over said blade for grooving the bottom surface of the board.

2. In a machine for trimming lumber comprising a vertical trim saw and a continuous horizontal belt for feeding lumber to the saw, the saw being mounted adjacent the feed belt and extending from above through the plane of the feed belt, at least one knife blade having a beveled cutting edge mounted on the side of the lumber opposite the side on which the saw enters the lumber adjacent the feed belt in advance of and in a plane closely parallel to the saw, the edge of the knife blade extending slightly into the surface of the lumber.

3. The invention according to claim 2 in which means are provided for exerting continuous pressure to force the knife blade into the lumber.

References Cited in the file of this patent
UNITED STATES PATENTS

| Number | Name | Date |
|---|---|---|
| 366,841 | Johnson | July 18, 1887 |
| 518,655 | Stow | Apr. 24, 1894 |
| 684,764 | Cunningham | Oct. 15, 1901 |
| 1,566,624 | Smith | Dec. 22, 1925 |
| 2,478,807 | Critchfield | Aug. 9, 1949 |